United States Patent [19]

Yamasaki et al.

[11] Patent Number: 4,693,544
[45] Date of Patent: Sep. 15, 1987

[54] OPTICAL BRANCHING DEVICE WITH INTERNAL WAVEGUIDE

[75] Inventors: Tetsuya Yamasaki, Amagasaki; Eiji Okuda, Itami, both of Japan

[73] Assignee: Nippon Sheet Glass Co., Ltd., Osaka, Japan

[21] Appl. No.: 558,507

[22] Filed: Dec. 6, 1983

[30] Foreign Application Priority Data

Dec. 14, 1982 [JP] Japan ................ 57-218902
Jan. 19, 1983 [JP] Japan .................. 58-6775

[51] Int. Cl.[4] .............................................. G02B 6/28
[52] U.S. Cl. ................... 350/96.16; 350/96.12; 350/96.13; 350/96.15; 370/1
[58] Field of Search ............ 350/96.11, 96.12, 96.13, 350/96.15, 96.16, 96.17, 96.20; 370/1, 3

[56] References Cited

U.S. PATENT DOCUMENTS

| | | | |
|---|---|---|---|
| 4,223,977 | 9/1980 | Papuchon et al. | 350/96.11 |
| 4,306,765 | 12/1981 | Winzer et al. | 350/96.16 |
| 4,375,312 | 3/1983 | Tangonan | 350/96.12 |
| 4,468,085 | 8/1984 | Papuchon et al. | 350/96.11 X |

FOREIGN PATENT DOCUMENTS

| | | | |
|---|---|---|---|
| 2903288 | 8/1979 | Fed. Rep. of Germany | 350/96.16 |
| 3036867 | 5/1982 | Fed. Rep. of Germany | 350/96.15 |
| 58-68713 | 4/1983 | Japan | 350/96.15 |

OTHER PUBLICATIONS

Snedaker, "Liquid Crystal Optical Switch", *IBM Tech. Discl. Bulletin*, vol. 25, No. 4, Sep. 1982, pp. 1855-1856.

*Primary Examiner*—John Lee
*Attorney, Agent, or Firm*—Woodcock Washburn Kurtz Mackiewicz & Norris

[57] ABSTRACT

An optical waveguide device of the invention has an optical waveguide which is a region formed in a transparent substrate and has a refractive index higher than that of the transparent substrate. The optical waveguide consists of first and second optical waveguide elements each having one end exposed to a surface of the transparent substrate and the other end connected in the vinicity of the surface of the transparent substrate, such that the connecting portion thereof is exposed to the surface of the transparent substrate.

12 Claims, 18 Drawing Figures

OPTICAL BRANCHING DEVICE WITH INTERNAL WAVEGUIDE

BACKGROUND OF THE INVENTION

(1) Field of the Invention

The present invention relates to an optical waveguide device which has an optical waveguide comprising a region which is formed in a transparent substrate and which has a refractive index higher than that of the transparent substrate. More particularly, the present invention relates to an optical waveguide device which may be suitably adapted for an element for constituting a demultiplexer, a multiplexer, a demultiplexer/multiplexer, a coupler, an optical switch or the like.

(2) Description of the Prior Art

A multiplexer, a demultiplexer or a demultiplexer/multiplexer is an important device in an optical communication system.

A conventional demultiplexer for demultiplexing mixed light comprising light of three or four wavelengths into light components each of a single wavelength generally utilizes an interference filter. A conventional demultiplexer for demultiplexing mixed light of a higher multiplexing degree involving 8 to 10 wavelengths generally utilizes a diffraction grating. This is because a demultiplexer utilizing an interference filter becomes increasingly complex in structure as the degree of multiplexing increases.

A demultiplexer utilizing an interference filter as shown in FIG. 1, for example, is known. In this demultiplexer, a unit demultiplexer element consists of a pair of graded index type lenses 1 whose end faces oppose each other such that an interference filter 2 is interposed therebetween and their central axes are aligned with each other. Each of the lenses has a length which is ¼ the periodical pitch of light and has a refractive index distribution wherein the refractive index is maximum at the central axis and parabolically decreases toward the outer periphery. A plurality of (a pair of in this case) such unit demultiplexer elements 3A and 3B, respectively, are bonded such that the central axes are offset from each other. An interference filter 2A or 2B of the respective element 3A or 3B reflects light of a specific wavelength $\lambda_1$ or $\lambda_2$ and transmits light of other wavelengths.

In a demultiplexer as described above, mixed light having wavelengths of $\lambda_1$, $\lambda_2$ and $\lambda_3$ supplied through a single optical fiber 4A is demultiplexed, and light components respectively having single wavelengths of $\lambda_1$, $\lambda_2$, and $\lambda_3$ can be obtained from optical fibers 4B, 4C and 4D connected to the elements 3A and 3B.

When a demultiplexer for demultiplexing light having three to four different wavelengths has a configuration as described above, since a plurality of cylindrical lens systems must be connected to each other with offset axes, the overall structure becomes complex and assembly is difficult. Furthermore, insrtion loss of such a demultiplexer is relatively high since the end face of the input optical fiber 4A connected to the lens 1 is not a point source and the lens 1 has aberration.

In view of this problem, another conventional demultiplexer as shown in FIG. 2 has also been proposed. In this demultiplexer, a triangular prism base 5 is coupled to one surface 6A of a transparent substrate 6, and a graded index type lens 1 having a length corresponding to ¼ the periodical pitch of light and an input optical fiber 4A are connected to the base 5. Similar combinations of prism bases 5, graded index type lenses 1, and optical fibers 4B, 4C, 4D and 4E, respectively, are coupled to the surface 6A and the opposing surface 6B of the substrate 6, through interference filters 2B, 2C, 2D and 2E, respectively. The interference filters 2B, 2C, 2D and 2E respectively transmit light having specific corresponding wavelengths $\lambda_1$, $\lambda_2$, $\lambda_3$ and $\lambda_4$, and reflect light having other wavelengths.

In such a conventional demultiplexer, light incident through the optical fiber 4A can be collimated by the lens 1 so as to become obliquely incident on the substrate 6, and repeatedly transmitted and reflected by the interference filters 2B, 2C, 2D and 2E, so that light components having the respective wavelengths $\lambda_1$, $\lambda_2$, $\lambda_3$ and $\lambda_4$ can be obtained through the optical fibers 4B, 4C, 4D and 4E, respectively.

However, a demultiplexer having the above configuration also suffers from the problem of a high insertion loss with an increase in the degree of multiplexing as in the case of the demultiplexer shown in FIG. 1. Because, the light beam diverges during propagation within the substrate 6 since the end face of the input optical fiber 4A is not a point source and the lens 1 has aberration.

Still another conventional demultiplexer is also known, as shown in FIG. 3. In this demultiplexer, an optical fiber 7A for receiving mixed light is cut along oblique planes of 45°. Interference filters 2A and 2B for reflecting light having specific wavelengths $\lambda_1$ and $\lambda_2$, respectively, are inserted at such oblique planes of the fiber 7A. Optical fibers 7B and 7C for transmitting light components having the wavelengths $\lambda_1$ and $\lambda_2$ reflected by the filters 2A and 2B, respectively, are coupled to the side of the fiber 7A.

In this conventional demultiplexer, in order to obtain light having a sharp spectrum distribution at the fibers 7B and 7C, two other interference filters 2C and 2D for allowing transmission of only light components having wavelengths of $\lambda_1$ and $\lambda_2$ are additionally arranged at the interfaces between the fiber 7A and the fibers 7B and 7C, respectively.

The insertion loss of this conventional demultiplexer is relatively low when light of wavelength $\lambda_3$ is transmitted to an optical fiber 7D which is coaxially connected to the input optical fiber 7A and which produces non-reflected light which has not been reflected by the interference filters 2A and 2B. However, when light components having wavelengths of $\lambda_1$ and $\lambda_2$ become incident on the optical fibers 7B and 7C which are connected to the side of the fiber 7A, the beams tend to diverge, resulting in a high insertion loss again.

In an optical communication system, a device called an access coupler is also important as a coupler which divides a portion of data from a trunk line, supplies the divided data portion to a terminal or the like for processing thereat, and combines the processed data from the terminal to the data of the trunk line. An access coupler has been proposed wherein an optical waveguide is formed in a transparent substrate of a transparent material such as glass or a plastic.

As a method for fabricating such a coupler by forming an optical waveguide in a transparent substrate, a method as shown in FIG. 4 is known. In the method shown in FIG. 4, a branch angle $\theta$ is changed while a width W of the optical waveguide is kept constant, so that the ratio of the light outputs from output terminals 8 and 9, that is, $PO_2/PO_1$ is changed. When $\theta$ is set to be 1° or less, for example, we have the ratio $PO_2/PO_1 \approx 1$, providing a two-branch coupler. However, the branch ratio to be adopted in an access coupler is as small as 1/5 to 1/20. In order to obtain such a small ratio, the angle $\theta$ must be increased. When the angle $\theta$ is increased, the loss at the branch portion is increased, resulting in a higher insertion loss $(PO_2+PO_1)/PI$.

In view of this problem, a method as shown in FIG. 5 has also been proposed. In this method, the angle $\theta$ is decreased to decrease the insertion loss. More specifically, widths $W_1$ and $W_2$ at output terminals 8 and 9 of the optical waveguide are rendered to be smaller than a width $W_0$ at the input side of the waveguide amd a relation $W_1 > W_2$ is satisfied, so that the output ratio $PO_2/PO_1$ is decreased. However, with this method, in the case of a multimode fiber, only a slight change in the connecting position of the input optical fiber results in a significant change in the output ratio $PO_2/PO_1$, so that high-precision setting of the output ratio $PO_2/PO_1$ is difficult.

OBJECTS AND SUMMARY OF THE INVENTION

It is an object of the present invention to provide an optical waveguide device which may be suitably used as an element for a demultiplexer, a multiplexer, a demultiplexer/multiplexer, a coupler, an optical switch or the like which has a simple structure and a low loss.

According to an aspect of the present invention, there is provided an optical waveguide device which has an optical waveguide comprising a region formed in a transparent substrate and having a refractive index higher than that of the transparent substrate, the optical waveguide having first and second waveguide elements, each of which has one end exposed to a surface of said transparent substrate and the other end coupled in a substantially V shape in the vicinity of a surface of said transparent substrate, the coupled portion thereof being exposed to the surface of said transparent substrate.

When the optical waveguide device of the present invention is used as a demultiplexer, a multiplexer, or a demultiplexer/multiplexer, an end of an input optical fiber is directly coupled to the surface portion of the transparent substrate at which the one end of the optical waveguide is exposed, an interference filter for transmitting light of a single wavelength is arranged at the surface portion of the transparent substrate at which the connecting portion of the waveguide elements is exposed, and an end of an optical fiber for transmitting the light of the wavelength received from the interference filter is connected thereto.

When the optical waveguide device of the present invention is used as a coupler, a third waveguide element branches from a position intermediate between the one end of the second waveguide element and the connecting portion and reaches the surface of the transparent substrate such that the third waveguide element crosses the second waveguide element at an acute angle therewith toward the connecting portion, a portion of the light propagated through the first waveguide element is produced through a filter arranged at the surface portion of the transparent substrate at which the connecting portion is exposed, the remaining portion of the light is reflected by the same filter, and input light transmitted through the third waveguide element is combined with that propagating through the second waveguide element.

According to the present invention, the buried optical waveguide may have either a uniform refractive index distribution within the entire cross-section of the waveguide or a refractive index distribution wherein the refractive index is maximum at the center and reduces parabolically toward the outer periphery, as in an embodiment to be described below. When the waveguide has the refractive index distribution of the former type, light propagates in the waveguide and the surrounding portion by repetitive total reflection. On the other hand, when the waveguide has the refractive index distribution of the latter type, light propagates along a sine cuve.

Figure 1:
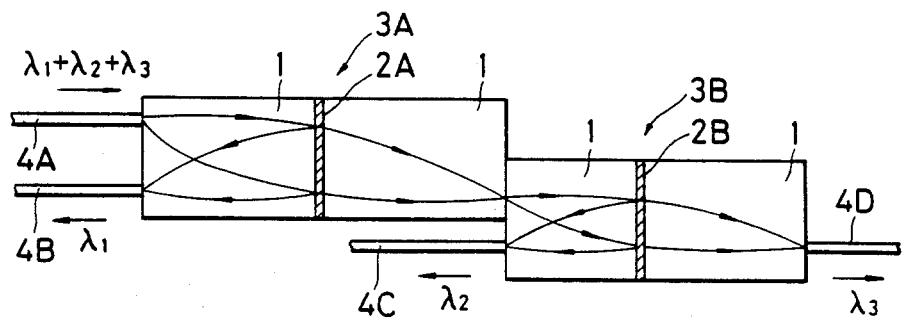
FIGS. 1 to 3 are cross-sectional views showing conventional optical waveguide devices used for a multiplexer or a demultiplexer.
Figure 2:
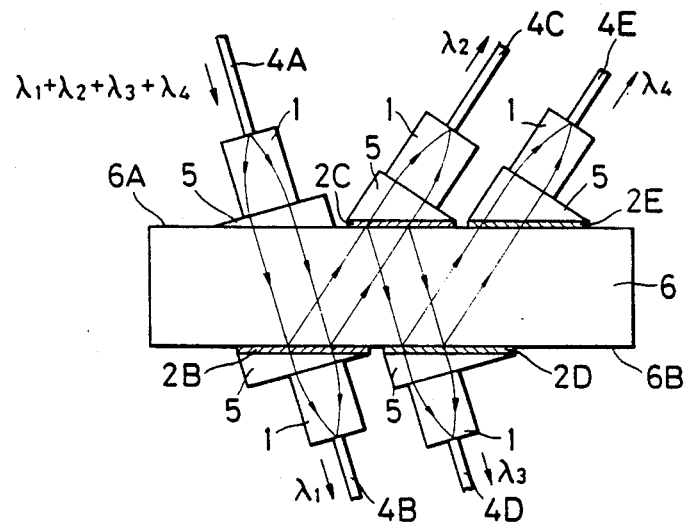
Figure 3:
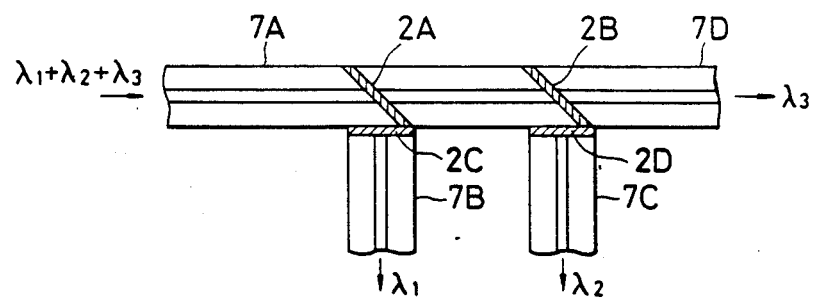
Figure 4:
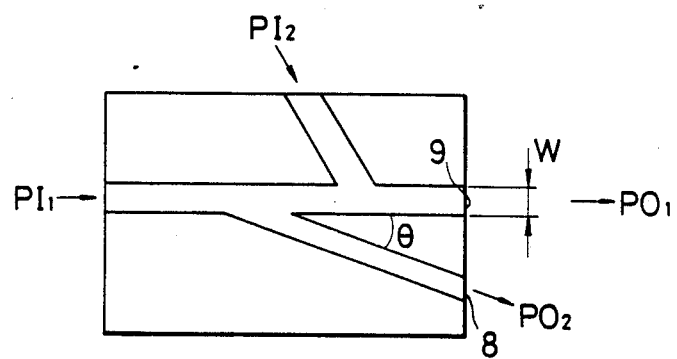
FIGS. 4 and 5 are cross-sectional views showing conventional optical waveguide devices used as an access coupler.
Figure 5:
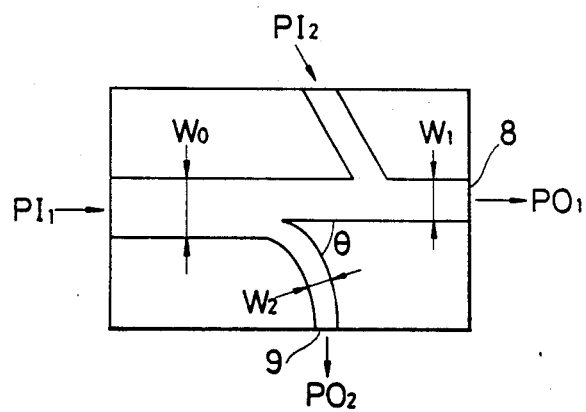

In the drawings described above, hatchings of the sections of the optical fibers, lenses, prisms, and transparent substrates are omitted for illustrative convenience.

DETAILED DESCRIPTION OF THE PREFERRED EMBODIMENTS

The first through sixth embodiments of the present invention will now be described with reference to FIGS. 6 to 13.

Figure 6:
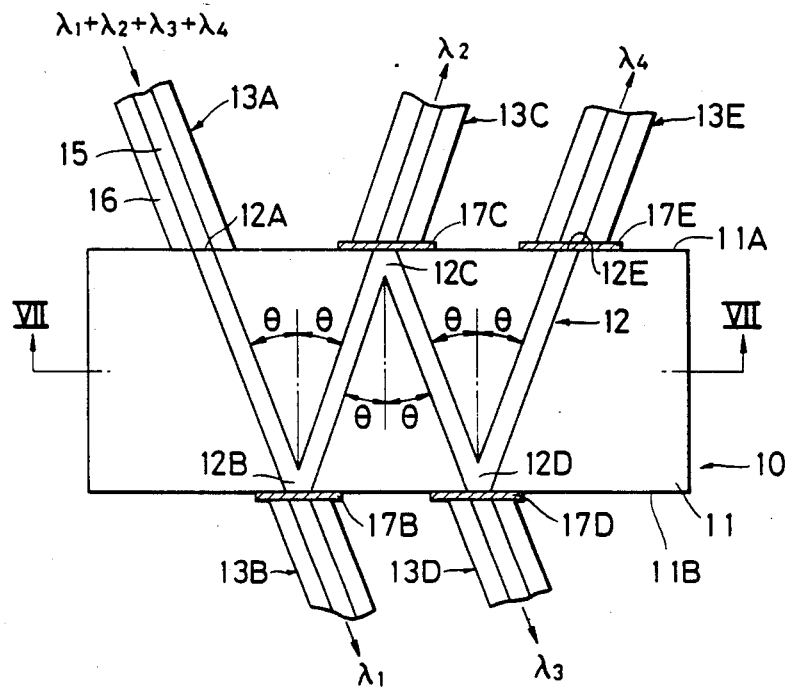
FIG. 6 is a cross-sectional view of an optical waveguide device according to a first embodiment of the present invention.
Figure 7:
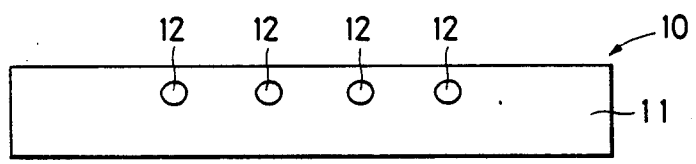
FIG. 7 is a longitudinal sectional view along the line VII—VII of the device shown in FIG. 6.

FIGS. 6 and 7 show the first embodiment of the present invention wherein an optical waveguide device of the present invention is applied to a demultiplexer/multiplexer.

Referring to FIGS. 6 and 7, reference numeral 10 denotes an optical waveguide body according to the present invention wherein an optical waveguide 12 comprises a region which is formed in a parallelepiped transparent substrate 11 of glass, quartz, a plastic or the like and has a refractive index higher than that of the transparent substrate 11. The term "transparent" is used herein to mean that light to be used is transmitted. The optical waveguide 12 has a substantially circular section and has a graded index distribution wherein, for example, a refractive index $n_0$ is maximum at the center, decreases toward the outer periphery, and becomes the same as the refractive index $n_1$ of the substrate 11 at the waveguide portion sufficiently spaced apart from the center thereof.

The optical wave guide 12 consists of first to fourth linear optical waveguide elements which are sequentially coupled to each other in substantially V shapes at a pair of parallel side surfaces 11B and 11A of the substrate 11, thereby forming a W shape parallel to the surface of the substrate 11. One end 12A of the optical waveguide 12 is exposed to the surface 11A of the substrate 11, and connecting portions 12B, 12C and 12D and the other end 12E of the optical waveguide 12 are alternately exposed to the side surfaces 11B and 11A of the substrate 11.

The axes of the first through fourth optical waveguide elements are within an imaginary plane which is perpendicular to the side surfaces 11A and 11B, and are inclined at an angle $\theta$ with respect to a line which is normal to the side surfaces 11A and 11B and which is included in the imaginary plane. Although various modifications may be made depending upon the application of the device, in this first embodiment, the axes of the first through fourth optical waveguide elements cross each other at the side surfaces 11A and 11B. In subsequent embodiments of the present invention, the relationships between the optical waveguide elements may be determined in the above-described manner.

An input optical fiber 13A consisting of a core 15 having substantially the same diameter as that of the optical waveguide 12 and a cladding 16 surrounding it and having a low refractive index is coupled through an adhesive or the like to the one end 12A of the waveguide 12 at the side surface 11A of the transparent substrate 11, such that the end face of the fiber 13A is cut obliquely, and the axes of the core 15 and the waveguide 12 are aligned with each other. The connecting portions 12B, 12C and 12D and the other end 12E of the optical waveguide 12 are also exposed to the surfaces 11A and 11B of the substrate 11 to respectively have the same diameter as that of the one end 12A.

An interference filter 17B which transmits light of a specific wavelength $\lambda_1$ and reflects light of other wavelengths is formed by deposition or the like onto the portion of the surface 11B of the substrate 11 at which the first connecting portion 12B is exposed. An oblique end of an optical fiber 13B having a similar structure to that of the optical fiber 13A is connected to the connecting portion 12B through the interference filter 17B.

Similarly, an interference filter 17C which transmits light of a specific wavelength $\lambda_2$ and reflects light of other wavelengths is arranged at the portion of the surface 11A of the substrate 11 at which the second connecting portion 12C is exposed. An oblique end of an optical fiber 13C is connected to the connecting portion 12C through the interference filter 17C. Likewise, an optical fiber 13D is connected through an interference filter 17D for transmitting only light having a wavelength $\lambda_3$ to the portion of the surface 11B of the substrate 11 at which the third connecting portion 12D is exposed. An optical fiber 13E is connected to the other end 12E of the optical waveguide 12 through an interference filter 17E for transmitting only light having a wavelength $\lambda_4$.

Instead of arranging the interference filters 17B, 17C, 17D and 17E at the side surfaces 11A and 11B of the substrate 11, they may be arranged at the end faces of the corresponding fibers 13B, 13C, 13D and 13E which are to be coupled to the side surfaces 11A and 11B of the substrate 11. In order that the interference filters 17B, 17C, 17D and 17E perform predetermined functions, the angle $\theta$ is preferably 20° or less, and is as small as possible for better operation of the device.

When mixed light becomes incident from the one end 12A into the optical waveguide 12 in the demultiplexer/multiplexer of the structure as described above, the mixed light propagates in a weaving manner within the optical waveguide 12 and reaches the connecting portion 12B. At the connecting portion 12B, only the light which has the wavelength $\lambda_1$ is transmitted through the interference filter 17B and is guided outside the optical waveguide 12. The remaining light is reflected by the interference filter 17B, propagates within the waveguide 12, and reaches the connecting portion 12C. In a similar manner to that at the connecting portion 12B, light having the wavelengths $\lambda_2$, $\lambda_3$ and $\lambda_4$ is guided outside the waveguide 12 at the respective connecting portions 12C, 12D and 12E.

Therefore, when mixed light of light having the wavelengths $\lambda_1$, $\lambda_2$, $\lambda_3$ and $\lambda_4$ is supplied to the optical fiber 13A, the light having the wavelength $\lambda_1$ is obtained from the optical fiber 13B opposing the optical fiber 13A, and light having the wavelengths $\lambda_2$, $\lambda_3$ and $\lambda_4$ are obtained from the optical fibers 13C, 13D and 13E, respectively.

Conversely, when light having the wavelengths $\lambda_1$, $\lambda_2$, $\lambda_3$ and $\lambda_4$ are supplied through the optical fibers 13B, 13C, 13D and 13E, respectively, mixed light having wavelengths of $\lambda_1 + \lambda_2 + \lambda_3 + \lambda_4$ can be obtained from the optical fiber 13A. It is to be understood that the demultiplexer/multiplexer described above can be applied to either a multimode fiber or a single mode fiber.

In a demultiplexer/multiplexer utilizing an optical waveguide device of the present invention, an interference filter is arranged at a surface portion of a transparent substrate at which a connecting portion of optical waveguide element is exposed and an optical fiber is connected to the interference filter. Unlike the conventional device, a lens for converting light from the optical fiber into parallel light is not required. The device of the present invention is simple in structure, has a small number of junction surfaces, and therefore has a low loss at the junction surfaces.

Furthermore, in the device of the present invention, diffused input light from the input optical fiber is transmitted to an output optical fiber through an optical waveguide which is formed in the substrate and has an optical transmission function equivalent to that of the optical fiber. With the effect of a small number of junction surfaces as described above, the overall loss of the device of the present invention is reduced as compared to the conventional device, thus providing a high-sensitivity, high-precision demultiplexer/multiplexer. These effects as obtained in the above embodiment can also be obtained in the subsequent embodiments.

Figure 8:
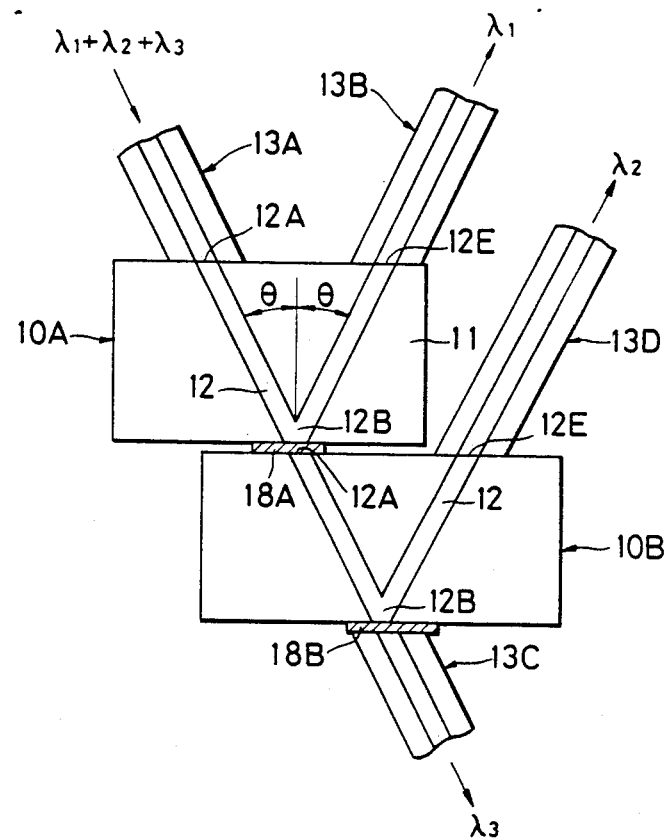
FIG. 8 is a cross-sectional view of an optical waveguide device according to a second embodiment of the present invention.

FIG. 8 shows an embodiment of the present invention wherein an optical waveguide device of the present invention is similarly applied to a demultiplexer/multiplexer.

In the second embodiment, a pair of optical waveguide bodies 10A and 10B, each having a similar structure to that of the first embodiment except that the shape of the waveguide 12 in the transparent substrate 11 is V-shaped, are opposed to each other.

In the first optical waveguide body 10A, optical fibers 13A and 13B with oblique ends are connected to two ends 12A and 12E of the waveguide 12 such that the optical axes of the fibers 13A and 13B are aligned with that of the waveguide 12. One end 12A of the waveguide 12 of the second optical waveguide body 10B is connected, through an interference filter 18A for reflecting light having the wavelength $\lambda_1$ and transmitting light having other wavelengths, to the surface portion of the substrate 11 at which the connecting portion 12B of the waveguide 12 of the first waveguide body 10A is exposed.

An optical fiber 13C is connected, through an interference filter 18B for reflecting light having the wavelength $\lambda_2$ and transmitting light having other wavelengths, to the surface portion of the substrate 11 at which the connecting portion 12B of the waveguide 12 of the second waveguide body 10B is exposed. An optical fiber 13D is connected to the other end 12E of the waveguide 12 of the second waveguide body 10B without the intermediacy of an interference filter.

When mixed light having wavelengths $\lambda_1$, $\lambda_2$ and $\lambda_3$ is supplied to the first optical waveguide body 10A through the optical fiber 13A, light having the wavelength $\lambda_1$ is reflected by the first interference filter 18A and is guided outside the waveguide body 10A through the optical fiber 13B. The remaining mixed light having the wavelengths $\lambda_2$ and $\lambda_3$ and transmitted through the interference filter 18A propagates within the waveguide 12 of the second waveguide body 10B and reaches the second interference filter 18B. Light having the wavelength $\lambda_2$ is reflected by the second interference filter 18B and is guided outside the waveguide body 10B through the optical fiber 13D connected to the other end 12E of the waveguide 12. Light having the wavelength $\lambda_3$ transmitted through the interference filter 18B is guided outside the waveguide body 10B through the optical fiber 13C. In this manner, the mixed light having the wavelengths of $\lambda_1$, $\lambda_2$ and $\lambda_3$ can be demultiplexed into light components having the respective wavelengths.

Conversely, when light components respectively having the wavelengths $\lambda_1$, $\lambda_2$ and $\lambda_3$ are supplied through the optical fibers 13B, 13D and 13C, mixed light having the wavelengths $\lambda_1$, $\lambda_2$ and $\lambda_3$ is obtained through the optical fiber 13A.

Figure 9:
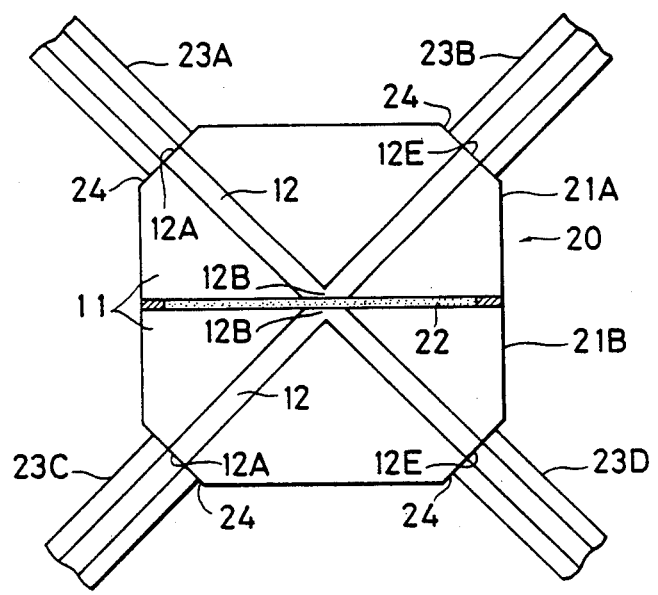
FIG. 9 is a cross-sectional view of an optical waveguide device according to a third embodiment of the present invention.

FIG. 9 shows a third embodiment of the present invention wherein an optical waveguide device of the present invention is applied to an optical switch.

In an optical switch 20 of this embodiment, a pair of optical waveguide bodies 21A and 21B according to the present invention are symmetrically opposed to each other with a liquid crystal 22 interposed therebetween. Optical fibers 23A and 23B are connected to one end 12A and the other end 12E, respectively, of an optical waveguide 12 of the waveguide body 21A. Similarly, optical fibers 23C and 23D are connected to one end 12A and the other end 12E, respectively, of an optical waveguide 12 of the waveguide body 21B.

In the optical waveguide body 21A, the optical waveguide 12, which comprises a region having a refractive index higher than that of a transparent substrate 11 of glass, a plastic or the like, is formed in the transparent substrate 11 in a V shape. A connecting portion 12B of the waveguide 12 is exposed to one side of the waveguide body 21A. Opposing corners of the substrate 11 are formed into corner surfaces 24 which are perpendicular to the axis of the waveguide 12. The ends of the optical fibers 23A and 23B are bonded to the corner surfaces 24 such that the optical axes thereof are aligned with the optical axis of the waveguide 12.

The optical fibers 23C and 23D are connected to similar corner surfaces 24 of the waveguide body 21B. The waveguide bodies 21A and 21B are opposed such that the connecting portions 12B of the waveguides 12 oppose each other. A layer of the liquid crystal 22 is sealed between the two waveguide bodies 21A and 21B.

Although not shown in the drawings, transparent conductor films are formed on the surfaces of the optical waveguide bodies 21A and 21B sandwiching the liquid crystal 22 therebetween, so that a controlled external voltage may be applied thereto.

In the optical switch as described above, when the liquid crystal 22 is transparent, light transmitted through the optical fiber 23A is transmitted to the optical fiber 23D arranged at a position opposite thereto. Light transmitted through the optical fiber 23C is similarly transmitted to the optical fiber 23B.

When the liquid crystal 22 is opaque, light supplied from the optical fiber 23A is reflected by the connecting portion 12B of the waveguide 12 and becomes incident on the optical fiber 23B. Light supplied from the optical fiber 23C is similarly reflected and becomes incident on the optical fiber 23D connected to the substrate 11. The optical switch functions in this manner.

Figure 10:
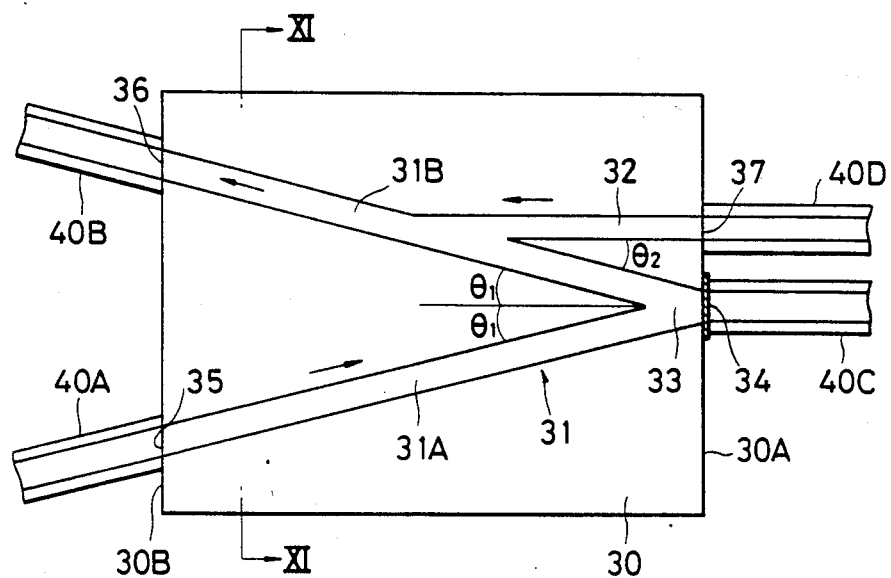
FIG. 10 is a cross-sectional view of an optical waveguide device according to a fourth embodiment of the present invention.
Figure 11:
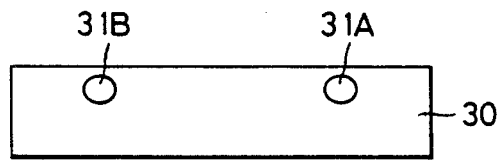
FIG. 11 is a longitudinal sectional view along the line XI—XI in FIG. 10.

FIGS. 10 and 11 show a fourth embodiment of the present invention wherein an optical waveguide device of the present invention is applied to an access coupler. An optical waveguide 31 having a circular section comprises a region which is formed in a transparent substrate 30 of a glass, a plastic or the like and has a refractive index higher than that of the substrate 30. The waveguide 31 consists of a first optical waveguide element as an input path 31A, a second optical waveguide element as an output path 31B, and a third optical waveguide as an input branch path 32 which extends from the second optical waveguide element to a side surface 30A of the substrate 30. The branch path 32 need not be included in a plane including the input path 31A and the output path 31B.

The diameter of the waveguide 31 is substantially equal to the core diameter of a group of optical fibers 40A, 40B, 40C and 40D connected to the access coupler, and is substantially uniform along the entire waveguide 31.

A connecting portion 33 of the waveguide 31 is exposed to the side surface 30A of the substrate 30. The shape of the connecting portion 33 at the exposed portion is substantially circular and corresponds to the core diameter of the optical fiber 40C connected thereto.

The input path 31A and the output path 31B form the same angle $\theta_1$ with respect to a line normal to the side surface 30A of the substrate 30. A dielectric filter 34 which transmits a portion of the light transmitted within the input path 31A and reflects the remaining light is arranged at the portion of the side surface 30A of the substrate 30 which corresponds to the connecting portion 33 of the input and output paths 31A and 31B. The angle $\theta_1$ is set to be sufficiently smaller (in general, 20° or less) than the total reflection critical angle of the dielectric filter 34.

The input branch path 32 is formed to merge with the output path 31B at a midpoint thereof such that its axis forms an angle $\theta_2$ with respect to the axis of the output path 31B toward the connecting portion 33. If the angle $\theta_2$ is too great, too great a merge loss occurs. For this reason, the angle $\theta_2$ is generally 10° or less, preferably 4° or less, and more preferably 2° or less. When the angle $\theta_2$ is set to satisfy this condition, the merge loss can be minimized to the extent that it is negligible.

The transmittance of the filter 34 to be used in this embodiment is set to fall within the range of 20 to 5% such that the output light power has a desired branch ratio under the given condition $\theta_1$ of the optical axis of the input path 31A. Although the filter 34 is formed on the side surface 30A of the substrate 30 in this embodiment, it may be formed on the end face of the optical fiber 40C to be connected thereto.

The optical fiber 40A as a trunk line is connected to an end 35 (side surface 30B of the substrate 30) of the input path 31A of the access coupler described above, and another optical fiber 40B as a trunk line is connected to an end 36 of the output path 31B exposed to the side surface 30B of the substrate 30. Still another optical fiber 40D for transmitting optical signal data processed at a terminal or the like is connected to an end 37 of the input branch path 32 exposed to the side surface 30A of the substrate 30.

The optical signal data transmitted by the optical fiber 40A in the device of the structure as described above is transmitted through the input path 31A of the access coupler, partially transmitted through the filter 34, and is transmitted to a terminal or the like connected to the optical fiber 40C therethrough. Instead of connecting the optical fiber 40C to the coupler, a photodetector may be connected so as to monitor optical data transmitted through the trunk line.

The remaining light which is reflected by the filter 34 is passed within the output path 31B in the access coupler, and is transmitted to the optical fiber 40B of the trunk line connected to the end 36.

The data signal processed by and transmitted from the terminal through the optical fiber 40D becomes incident on the input branch path 32 in the access coupler, and merges with the trunk line signal propagating within the output path 31B through the branch line 32.

When the shape and refractive index of the optical waveguide 31 are properly selected to achieve single mode transmission, the access coupler of the structure as described above can serve as a single-mode access coupler.

In accordance with an access coupler of the present invention, when the transmittance of the filter is properly selected, the trunk signal can be divided in a high branch ratio of 5:1, for example, at high precision, while maintaining a uniform diameter of the waveguide throughout the coupler.

Since the diameter of the waveguide can be kept uniform, branch output light of a constant branch ratio can be obtained independently of the alignment between the input optical fiber and the waveguide.

When the filter for demultiplexing transmission light as used in the first and second embodiments is used in place of the filter 34 for dividing the transmission light as used in the fourth embodiment, the access coupler can be used as a demultiplexer/multiplexer.

Figure 12:
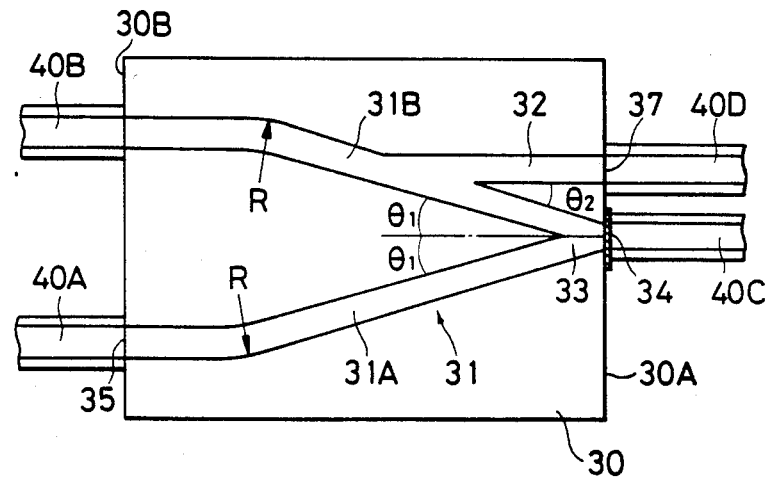
FIG. 12 is a cross-sectional view of an optical waveguide device according to a fifth embodiment of the present invention.

FIG. 12 shows a fifth embodiment of the present invention wherein an optical waveguide device of the present invention is similarly applied to an access coupler.

In this embodiment, the procedure of obliquely preparing the ends of trunk line optical fibers 40A and 40B is omitted. Instead, the vicinities of the ends of an input path 31A and an output path 31B are arcuated paths having a relatively large radius of curvature R, so that the optical axes of the paths 31A and 31B are perpendicular to a side surface 30B of a substrate 30. The remaining features of the access coupler of the fifth embodiment remain the same as those of the fourth embodiment.

Figure 13:
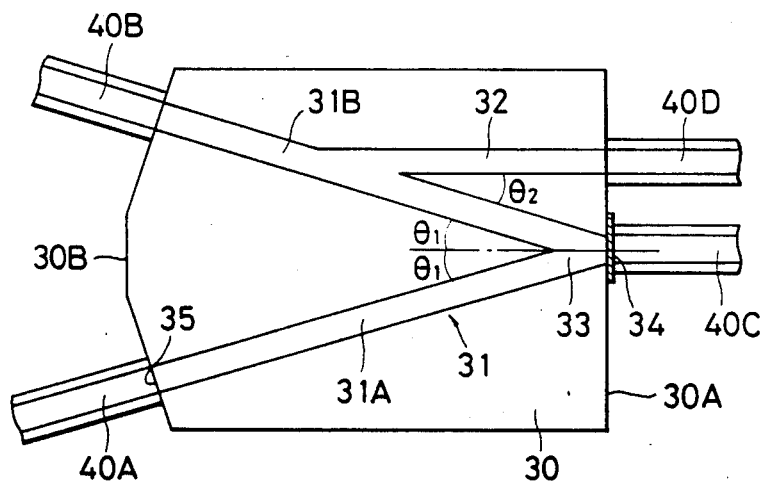
FIG. 13 is a cross-sectional view of an optical waveguide device according to a sixth embodiment of the present invention.

FIG. 13 shows a sixth embodiment of the present invention wherein an optical waveguide device of the present invention is similarly applied to an access coupler.

In this embodiment, an input path 31A and an output path 31B are both straight paths, and a side surface 30B of a substrate 30 is perpendicular to the optical axes of the paths 31A and 31B at their ends. Similar effects to those obtained in the fifth embodiment can also be obtained in the sixth embodiment.

A suitable method for fabricating an optical waveguide device according to the present invention will now be described with reference to FIGS. 14 and 15.

Figure 14A:
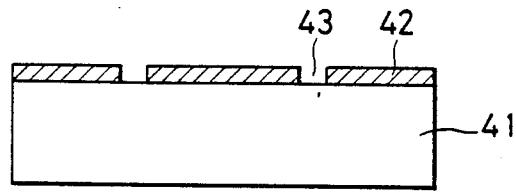
FIGS. 14A to 14D are longitudinal sectional views showing sequential steps of an example of a method for fabricating an optical waveguide device according to the present invention.

First, as shown in FIG. 14A, the top surface of a glass substrate 41 is covered with a mask 42 which prevents diffusion of ions therethrough. The mask 42 is patterned such that it is partially etched in a V-shape, for example, to form an opening 43.

Figure 15:
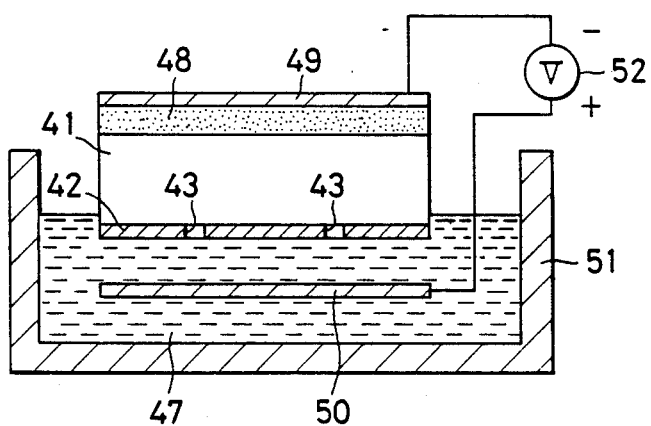
FIG. 15 is a longitudinal sectional view showing a method wherein a masked substrate is subjected to ion exchange with a molten salt in the steps shown in FIG. 14.

Next, as shown in FIG. 15, the surface of the substrate 41 covered with the mask 42 is brought into contact with a molten salt 47 containing ions having a high electronic polarization factor, such as thallium ions. The salt 47 and the substrate 41 are heated. An electric field is applied to the substrate 41 using the surface of the substrate 41 covered with the mask 42 as a positive electrode, and the opposite surface thereof as a negative electrode.

Figure 14B:
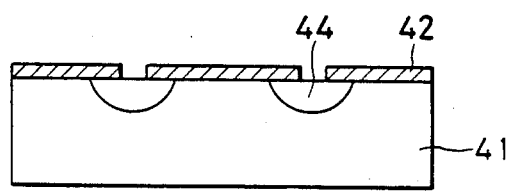

Then, the ions in the salt 47 are diffused into the substrate 41 through the opening 43. Some ions in the substrate 41 are liberated outside the substrate 41 through the opening 43 to form a high-refractive index region 44 in the substrate 41, as shown in FIG. 14B. When the width of the opening 43 in the mask 42 is set to be sufficiently small, for example, 5μ or less, the section of the resultant high-refractive index region 44 becomes substantially semicircular.

Figure 14C:
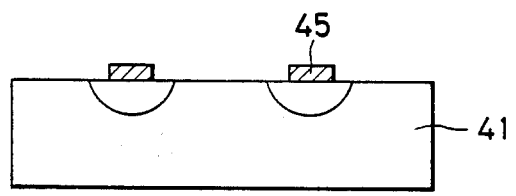

Subsequently, as shown in FIG. 14C, the mask 42 is removed, and a mask 45 having a width of 30 to 100% of that of the high-refractive index region 44 is formed only on the top surface of the region 44.

The surface of the substrate 41 on which the mask 45 is formed is brought into contact with a sulfate or a nitrate containing ions having a small electronic polarization factor, such as sodium ions and/or potassium ions. The salt and the substrate 41 are heated. An electric field is applied to the substrate 41, using the surface thereof covered with the mask 45 as a positive electrode and the opposite surface as a negative electrode.

Figure 14D:
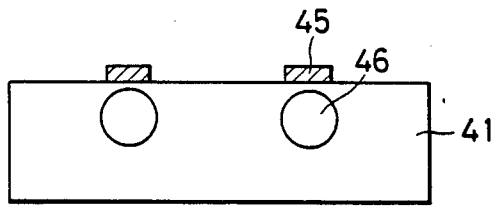

Then, ions in the salt are diffused to the portions of the substrate 41 which are not covered with the mask 45, and a high-refractive index region 46 having a substantially circular section is formed, as shown in FIG. 14D.

The first reason for the formation of circular section as the high-refractive index region 46 may be surmised as follows. That is, the ions having a small electronic polarization factor diffuse from the substrate surface portions surrounding the mask 45 not only to the substrate portions outside the mask 45 but also below the mask 45. However, the rate of such ion diffusion is small immediately below the mask 45 and is high at the substrate portions surrounding the mask 45.

The second reason may be as follows. In the region 44 containing ions having a high electronic polarization factor, the mobility of ions within the substrate 41 is smaller than that in the other portions of the substrate 41. In the portion of the region 44 immediately below the central portion of the mask 45, the concentration of the ions having a high electronic polarization factor is high and the diffusion depth is great. Accordingly, the mobility of the ions having a high electronic polarization factor is smaller in the portion of the region 44 immediately below the mask 45 than in the portions of the substrate 41 surrounding th region 44.

Since the high-refractive index region 46 is formed by application of an electric field, the refractive index changes in a stepwise manner in the region 46 if no special measure is taken.

However, if the glass substrate 41 is heated to a temperature which may not cause thermal deformation of the substrate 41, and ions having a high electronic polarization factor in the high-refractive index region 46 and surrounding ions having a low electroic polarization factor (that is, ions having a small effect in increasing the refractive index) are diffused, a refractive index distribution of the region 46 can be obtained wherein the refractive index gradually decreases outward from the optical axis. The resultant high-refractive index region 46 can also have a substantially circular section.

Referring to FIG. 15, reference numeral 48 denotes a dielectric paste layer formed of a paste of a clay and $KNO_3$; 49 and 50, electrode plates; 51, a molten salt tank; and 52, a DC current source.

Although the above description has been made with reference to a case wherein a glass is used for the substrate 41, an optical waveguide device of the present invention may be similarly obtained using a synthetic resin substrate. In this case, a partially polarized resin substrate is used in place of the glass substrate 41, and a monomer for forming a polymer having a higher refractive index than that of the substrate resin is diffused into the substrate in place of ions.

Alternatively, various other methods can be adopted such as a method for forming an optical waveguide in a quartz substrate utilizing a CVD technique which is used in the manufacture of an optical fiber. The effect of uniform diameter of an optical waveguide throughout an access coupler is particularly important in a case wherein an optical waveguide is formed by the ion exchange method using glass, an optical waveguide is formed by diffusing a monomer for forming a polymer having a high refractive index into a non-polymerized synthetic resin substrate through a mask having an opening corresponding to an optical waveguide pattern, or an optical waveguide is formed by CVD or PCVD.

When the width of the opening of the mask is nonuniform, the diffusion depth or deposition thickness of diffused ions, resin monomer or particles varies. As a result of this, the section of the resultant optical waveguide is distorted, resulting in a high transmission loss. This problem may be prevented in accordance with the optical waveguide in accordance with the present invention.

Although illustrative embodiments of the invention have been described in detail herein with reference to the accompanying drawings, it is to be understood that the invention is not limited to such precise embodiments, and that various changes and modifications may be effected therein by one skilled in the art without departing from the scope and spirit of the invention as defined in the appended claims.

What is claimed is:

1. An optical waveguide device comprising a region formed in a transparent substrate, the region having a refractive index higher than a refractive index of the transparent substrate and defining an optical waveguide within the transparent substrate, said optical waveguide having first and second optical waveguide elements, each of the waveguide elements having one end connected to the one end of the other optical waveguide element in a substantially V-shape in the vicinity of a first surface of said transparent substrate, a connecting portion of the connected ends of the two optical waveguide elements being exposed to the first surface of said transparent substrate, and a remaining end exposed to a surface of the transparent substrate other than said first surface; and a third optical waveguide element having one end exposed to the first surface of said transparent substrate, a remaining end of said third optical waveguide element and the remaining end of said second optical waveguide element being connected in a substantially V-shape in the vicinity of a second surface of said transparent substrate, and a connecting portion of the connected remaining end of said third optical waveguide element and the remaining end of said second optical waveguide element being exposed to the second surface of said transparent substrate.

2. An optical waveguide device according to claim 1, wherein said optical waveguide further has a fourth optical waveguide element having one end exposed to the second surface of said transparent substrate, the other end of said fourth optical waveguide element and the one end of said third optical waveguide element being connected in a substantially V shape in the vicinity of the first surface of said transparent substrate, and a connecting portion thereof being exposed to the first surface of said transparent substrate.

3. An optical waveguide device comprising a region formed in a transparent substrate, the region having a refractive index higher than a refractive index of the transparent substrate and defining an optical waveguide within the transparent substrate, said optical waveguide having first and second optical waveguide elements, each of the waveguide elements having one end connected to the one end of the other optical waveguide element in a substantially V-shape in the vicinity of a first surface of said transparent substrate, a connecting portion of the connected ends of the two optical waveguide elements being exposed to the first surface of said transparent substrate; and wherein an axis of each of said optical waveguide elements lies within an imaginary plane perpendicular to the first surface of said transparent substrate and is inclined at the same angle with respect to a line normal to the first surface of said transparent substrate, and the axes of the first and second optical waveguide elements also intersecting one another at the surface of the transparent substrate where the connecting portion is exposed;

wherein an optical filter is arranged on each surface portion of said transparent substrate where the connecting portion is exposed; and wherein the optical filter transmits light of predetermined wavelengths and reflects light of other wavelengths, respectively.

4. An optical waveguide device according to claim 3, wherein each optical filter transmits light in predetermined amounts and reflects remaining light, respectively.

5. An optical waveguide device according to claim 3, wherein another optical filter is arranged at an unconnected end of one of said optical waveguide elements.

6. An optical waveguide device according to claim 3, wherein one connecting portion in said transparent substrate and one end of an optical waveguide in a second transparent substrate are opposed to each other.

7. An optical waveguide device comprising a region formed in a transparent substrate and having a refractive index higher than a refractive index of the transparent substrate for defining an optical waveguide within the transparent substrate, said optical waveguide having first and second optical waveguide elements, each element having one end connected to the one end of the other element in a substantially V-shape in the vicinity of a first surface of said transparent substrate, a connecting portion of the connected ends of said first and second optical waveguide elements being exposed to the first surface of said transparent substrate, and a remaining end of each of the first and second optical waveguide elements being exposed to a surface of the transparent substrate other than said first surface; and a second transparent substrate including a region within the second transparent substrate having a refractive index higher than the refractive index of said second transparent substrate defining a second continuous, monolithic optical waveguide in the second transparent substrate, said second optical waveguide having first and second optical waveguide elements, each element having one end connected to one end of the other optical waveguide element in a substantially V-shape in the vicinity of a first surface of said second transparent substrate, a connecting portion of the connected ends of the first and second optical waveguide elements of the second transparent substrate being exposed to the first surface of said second transparent substrate, and a remaining end of each of said first and second optical waveguide elements of the second transparent substrate being exposed to a surface of the second transparent substrate other than said first surface of said second transparent substrate, the two transparent substrates being positioned with the first surfaces of each transparent substrate and with the connecting portions exposed to the first surfaces of each transparent substrate in opposition; and a liquid crystal between the first surfaces and the connecting portions of the two transparent substrates in opposition.

8. An optical waveguide device according to claim 7, wherein each surface of said transparent substrate and each surface of said second transparent substrate at which a remaining end of an optical waveguide element is exposed is formed substantially perpendicularly to an optical axis of said optical waveguide element exposed at said surface.

9. An optical waveguide device comprising a region formed in a transparent substrate and having a refractive index higher than a refractive index of the transparent substrate for defining an optical waveguide within the transparent substrate, said optical waveguide having first and second optical waveguide elements, each element having one end connected to the one end of the other element in a substantially V-shape in the vicinity of a first surface of said transparent substrate, a connecting portion of the connected ends of said first and second optical waveguide substrate, and a remaining end of each of the first and second optical waveguide elements being exposed to a surface of the transparent substrate other than said first surface; and a third optical waveguide element within the transparent substrate formed to branch from said second optical waveguide element at a midpoint between the two ends of said second optical waveguide element forming an acute angle towards the connecting portion with respect to said second optical waveguide element;

a portion of light transmitted through said first optical waveguide element passing through an optical filter arranged at a portion of the first surface of said transparent substrate where said connecting portion is exposed, a remaining portion of light being reflected by said optical filter through the second waveguide element; and light input through said third optical waveguide element merging with said remaining portion of light transmitted through said second optical waveguide element.

10. An optical waveguide device according to claim 9, wherein said first and second optical waveguide elements are respectively linear in shape.

11. An optical waveguide device according to claim 10, wherein each surface of said transparent substrate at which the remaining end of one of said first and second optical waveguide elements is exposed is formed substantially perpendicularly to an optical axis of the one of said first and second optical waveguide elements exposed at the surface.

12. An optical waveguide device according to claim 9, wherein said first and second optical waveguide elements each has an arcuated portion between the connecting portion and the remaining end thereof, and an optical axis at the remaining end is substantially perpendicular to a surface of said transparent substrate at which said remaining end of the optical waveguide element is exposed.

* * * * *